(12) United States Patent  
Miyata

(10) Patent No.: US 8,116,177 B2
(45) Date of Patent: Feb. 14, 2012

(54) OPTICAL PICKUP AND DISC DRIVE APPARATUS

(75) Inventor: Takuro Miyata, Kanagawa (JP)

(73) Assignee: Sony Corporation, Tokyo (JP)

( * ) Notice: Subject to any disclaimer, the term of this patent is extended or adjusted under 35 U.S.C. 154(b) by 233 days.

(21) Appl. No.: 12/211,212

(22) Filed: Sep. 16, 2008

(65) Prior Publication Data

US 2009/0103420 A1 Apr. 23, 2009

(30) Foreign Application Priority Data

Oct. 17, 2007 (JP) .................................. 2007-270358

(51) Int. Cl.
  *G11B 7/00* (2006.01)
  *G11B 11/00* (2006.01)
(52) U.S. Cl. .............. 369/44.16; 369/13.02; 369/112.23
(58) Field of Classification Search .......................... None
  See application file for complete search history.

(56) References Cited

U.S. PATENT DOCUMENTS

| 2001/0038581 A1* | 11/2001 | Kawano et al. ............ 369/44.16 |
| 2005/0041540 A1* | 2/2005 | Tanaka ........................ 369/44.15 |
| 2008/0031103 A1* | 2/2008 | Horinouchi et al. ........ 369/44.37 |
| 2008/0068974 A1* | 3/2008 | Kawano ................... 369/112.08 |

FOREIGN PATENT DOCUMENTS

JP 2007-102912 4/2007

* cited by examiner

*Primary Examiner* — Wayne Young
*Assistant Examiner* — Carl Adams
(74) *Attorney, Agent, or Firm* — Oblon, Spivak, McClelland, Maier & Neustadt, L.L.P.

(57) ABSTRACT

An objective-lens driving device includes a fixed block fixed to a moving base, a movable block having a lens holder configured to hold objective lenses, support springs configured to connect the fixed block and the movable block to each other, a focusing magnetic circuit including a first focusing coil, a second focusing coil, a first focusing magnet, and a second focusing magnet, and a tracking magnetic circuit. The first focusing coil is attached to the lens holder such that a first thrust-generating portion and a second thrust-generating portion are spaced from each other in a tangential direction. The second focusing coil is attached to the lens holder such that an axial direction of the second focusing coil coincides with the tangential direction. The first focusing magnet and the second focusing magnet are arranged in the tangential direction with the movable block disposed therebetween.

11 Claims, 7 Drawing Sheets

OPTICAL PICKUP AND DISC DRIVE APPARATUS

CROSS REFERENCES TO RELATED APPLICATIONS

The present invention contains subject matter related to Japanese Patent Application JP 2007-270358 filed in the Japanese Patent Office on Oct. 17, 2007, the entire contents of which are incorporated herein by reference.

BACKGROUND OF THE INVENTION

1. Field of the Invention

The present invention relates to an optical pickup and a disc drive apparatus. More particularly, the present invention relates to a technique for obtaining a large thrust for a focusing operation and reducing the thickness of a lens holder by attaching a first focusing coil and a second focusing coil to the lens holder in different orientations.

2. Description of the Related Art

In general, disc drive apparatuses are used for recording information signals on a disc-shaped recording medium, such as an optical disc and a magneto-optical disc, and reproducing the recorded information signals. The disc drive apparatuses include an optical pickup configured to move in a radial direction of the disc-shaped recording medium and irradiate the disc-shaped recording medium with a laser beam.

The optical pickup includes an objective-lens driving device, and the objective-lens driving device includes a fixed block and a movable block. The movable block is supported by a plurality of support springs, such as metal wires, which are fixed to the fixed block.

In the optical pickup, an objective lens is held by a lens holder provided on the movable block. Focus adjustment is performed by moving the movable block with respect to the fixed block in a focusing direction in which the movable block moves toward and away from a recording surface of the disc-shaped recording medium. In addition, tracking adjustment is performed by moving the movable block with respect to the fixed block in a tracking direction, which is substantially a radial direction of the disc-shaped recording medium. The focus adjustment and the tracking adjustment are performed such that the laser beam that is incident on the disc-shaped recording medium through the objective lens is focused to form a spot on the disc-shaped recording medium at a recording track thereof.

The objective-lens driving device provided in the optical pickup includes a focusing magnetic circuit for moving the movable block in the focusing direction and a tracking magnetic circuit for moving the movable block in the tracking direction. Each of the magnetic circuits includes a coil and a magnet.

In the objective-lens driving device, the movable block and the fixed block are connected to each other by the support springs such that the movable block and the fixed block are spaced from each other in a tangential direction, which is perpendicular to both the focusing direction and the tracking direction.

When the optical pickup is moved in the radial direction of the disc-shaped recording medium, the laser beam is guided to a rising mirror disposed below the objective lens through an optical-path opening formed in a surface of the lens holder that is opposite to a surface facing the fixed block. The laser beam is reflected by the rising mirror and is incident on the recording surface of the disc-shaped recording medium through the objective lens. In this state, the focus adjustment and the tracking adjustment are performed such that the laser beam that is incident on the disc-shaped recording medium through the objective lens is focused to form a spot on the disc-shaped recording medium at the recording track thereof.

An example of an objective-lens driving device of the related art is described in Japanese Unexamined Patent Application Publication No. 2007-102912. In this objective-lens driving device, focusing coils are attached to either side of the lens holder, which holds objective lens, in the tangential direction. The objective-lens driving device is structured such that the center (drive center) of thrust generated by the focusing coils and focusing magnets in the focusing direction coincides with the center of gravity of the movable block or the center of the objective lens.

The focusing operation is performed while the center of thrust coincides with the center of gravity of the movable block or the center of the objective lens. Consequently, unnecessary resonance can be suppressed and the reliability of the focusing operation can be increased.

SUMMARY OF THE INVENTION

In the above-described objective-lens driving device of the related art, the focusing coils are attached to the lens holder at either side thereof in the tangential direction. Therefore, the focusing coils should be attached in an area where the optical-path opening is not formed at one of the sides of the lens holder in the tangential direction.

Therefore, if the size of the focusing coils attached at the side having the optical-path opening is increased, the size of the lens holder is increased accordingly and it becomes difficult to reduce the size of the objective-lens driving device. Conversely, if the size of the focusing coils attached at the side having the optical-path opening is reduced in order to reduce the size of the objective-lens driving device, the thrust generated by the focusing magnetic circuit in the focusing operation decreases and it becomes difficult to obtain a sufficient thrust in the focusing operation.

It is desirable to solve the above-described problems and provide an optical pickup and a disc drive apparatus which are thin and capable of providing a large thrust for the focusing operation.

An optical pickup and a disc drive according to an embodiment of the present invention are provided with an objective-lens driving device including a fixed block fixed to the moving base, a movable block having the objective lens and a lens holder configured to hold the objective lens, the lens holder having an optical-path opening through which the laser beam emitted from the light source to be incident on the rising mirror passes, the movable block being movable with respect to the fixed block in at least a focusing direction in which the movable block moves toward and away from a recording surface of the disc-shaped recording medium and a tracking direction which is substantially a radial direction of the disc-shaped recording medium, a plurality of support springs configured to connect the fixed block and the movable block to each other, a focusing magnetic circuit configured to move the movable block in the focusing direction and including a first focusing coil, a second focusing coil, a first focusing magnet, and a second focusing magnet, and a tracking magnetic circuit configured to move the movable block in the tracking direction and including a tracking coil and a tracking magnet. An optical path of the laser beam that passes through the optical-path opening in the movable block extends in a tangential direction which is perpendicular to both the focusing direction and the tracking direction. The first focusing coil includes a first thrust-generating portion and a second thrust-generating portion that generate thrusts when the movable block is to be moved in the focusing direction, and is attached to the lens holder such that the first thrust-generating portion and the second thrust-generating portion are spaced from each other in the tangential direction. The second focusing coil is attached to a surface of the lens holder that faces the fixed block such that an axial direction of the second focusing coil coincides with the tangential direction. The first focusing magnet and the second focusing magnet are arranged in the tangential direction with the movable block disposed therebetween.

In the optical pickup and the disc drive apparatus, no focusing coil that is wound such that an axial direction thereof extends in the tangential direction is provided on a surface of the lens holder that has a light-path opening formed therein.

An optical pickup according to an embodiment of the present invention includes a disc table configured to receive a disc-shaped recording medium and an optical pickup configured to irradiate the disc-shaped recording medium on the disc table with a laser beam through an objective lens, the laser beam being emitted from a light source and reflected by a rising mirror, the optical pickup including a moving base configured to move in a radial direction of the disc-shaped recording medium on the disc table and an objective-lens driving device disposed on the moving base. The objective-lens driving device includes a fixed block fixed to the moving base, a movable block having the objective lens and a lens holder configured to hold the objective lens, the lens holder having an optical-path opening through which the laser beam emitted from the light source to be incident on the rising mirror passes, the movable block being movable with respect to the fixed block in at least a focusing direction in which the movable block moves toward and away from a recording surface of the disc-shaped recording medium and a tracking direction which is substantially a radial direction of the disc-shaped recording medium, a plurality of support springs configured to connect the fixed block and the movable block to each other, a focusing magnetic circuit configured to move the movable block in the focusing direction and including a first focusing coil, a second focusing coil, a first focusing magnet, and a second focusing magnet, and a tracking magnetic circuit configured to move the movable block in the tracking direction and including a tracking coil and a tracking magnet. An optical path of the laser beam that passes through the optical-path opening in the movable block extends in a tangential direction which is perpendicular to both the focusing direction and the tracking direction. The first focusing coil includes a first thrust-generating portion and a second thrust-generating portion that generate thrusts when the movable block is to be moved in the focusing direction, and is attached to the lens holder such that the first thrust-generating portion and the second thrust-generating portion are spaced from each other in the tangential direction. The second focusing coil is attached to a surface of the lens holder that faces the fixed block such that an axial direction of the second focusing coil coincides with the tangential direction. The first focusing magnet and the second focusing magnet are arranged in the tangential direction with the movable block disposed therebetween.

Therefore, the optical-path opening can be formed with a large opening area in the lens holder and the thickness of the movable block can be reduced. As a result, the thickness of the optical pickup can be reduced and a sufficiently large thrust can be generated in the focusing operation.

Preferably, each of the first focusing coil, the second focusing coil, and the tracking coil is formed in a substantially rectangular cylindrical shape having four side portions, and a side portion of the first focusing coil that is positioned near the second focusing coil serves as the second thrust-generating portion and is disposed at substantially the same position in the focusing direction as the position of a side portion of the second focusing coil that extends in the tracking direction. In such a case, the second thrust-generating portion is placed at a position where the magnetic power of the second focusing magnet is strong, and a large thrust can be obtained in the focusing operation.

Preferably, the following equation is satisfied:

$$F1a \times L1a = F1b \times L1b + F2 \times L2$$

where $F1a$ is a thrust in the focusing direction generated in the first thrust-generating portion of the first focusing coil due to a drive current supplied to the first focusing coil and magnetic flux of the first focusing magnet, $F1b$ is a thrust in the focusing direction generated in the second thrust-generating portion of the first focusing coil due to the drive current supplied to the first focusing coil and magnetic flux of the second focusing magnet, $F2$ is a thrust in the focusing direction generated in the second focusing coil due to a drive current supplied to the second focusing coil and the magnetic flux of the second focusing magnet, G is the center of gravity of the movable block, S is a plane including the center of gravity G and perpendicular to the tangential direction, $L1a$ is a minimum distance between the plane S and a point at which the thrust $F1a$ is generated, $L1b$ is a minimum distance between the plane S and a point at which the thrust $F1b$ is generated, and $L2$ is a minimum distance between the plane S and a point at which the thrust $F2$ is generated. In such a case, inclination around the center of gravity with respect to the tangential direction does not occur during the focusing operation. Therefore, satisfactory servo characteristics can be obtained in the focusing operation.

Preferably, a plurality of the objective lenses are provided, the objective lenses being arranged in the tracking direction, and the first focusing coil is arranged so as to surround the objective lenses. In such a case, the stability of the focusing operation can be improved and sufficiently large thrust can be generated in the focusing operation.

A disc drive apparatus according to an embodiment of the present invention includes a disc table configured to receive a disc-shaped recording medium, and an optical pickup configured to irradiate the disc-shaped recording medium on the disc table with a laser beam through an objective lens, the laser beam being emitted from a light source and reflected by a rising mirror, the optical pickup including a moving base configured to move in a radial direction of the disc-shaped recording medium on the disc table and an objective-lens driving device disposed on the moving base. The objective-lens driving device includes a fixed block fixed to the moving base, a movable block having the objective lens and a lens holder configured to hold the objective lens, the lens holder having an optical-path opening through which the laser beam emitted from the light source to be incident on the rising mirror passes, the movable block being movable with respect to the fixed block in at least a focusing direction in which the movable block moves toward and away from a recording surface of the disc-shaped recording medium and a tracking direction which is substantially a radial direction of the disc-shaped recording medium, a plurality of support springs configured to connect the fixed block and the movable block to each other, a focusing magnetic circuit configured to move the movable block in the focusing direction and including a first focusing coil, a second focusing coil, a first focusing magnet, and a second focusing magnet, and a tracking magnetic circuit configured to move the movable block in the tracking direction and including a tracking coil and a tracking magnet. An optical path of the laser beam that passes through the optical-path opening in the movable block extends in a tangential direction which is perpendicular to both the focusing direction and the tracking direction. The first focusing coil includes a first thrust-generating portion and a second thrust-generating portion that generate thrusts when the movable block is to be moved in the focusing direction, and is attached to the lens holder such that the first thrust-generating portion and the second thrust-generating portion are spaced from each other in the tangential direction. The second focusing coil is attached to a surface of the lens holder that faces the fixed block such that an axial direction of the second focusing coil coincides with the tangential direction. The first focusing magnet and the second focusing magnet are arranged in the tangential direction with the movable block disposed therebetween.

Therefore, the optical-path opening can be formed with a large opening area in the lens holder and the thickness of the movable block can be reduced. As a result, the thickness of the disc drive apparatus can be reduced and a sufficiently large thrust can be generated in the focusing operation.

BRIEF DESCRIPTION OF THE DRAWINGS

FIG. 1 is a schematic perspective view of the disc drive apparatus;

DESCRIPTION OF THE PREFERRED EMBODIMENTS

An optical pickup and a disc drive apparatus according to a preferred embodiment of the present invention will be described below with reference to the drawings.

Figure 1:
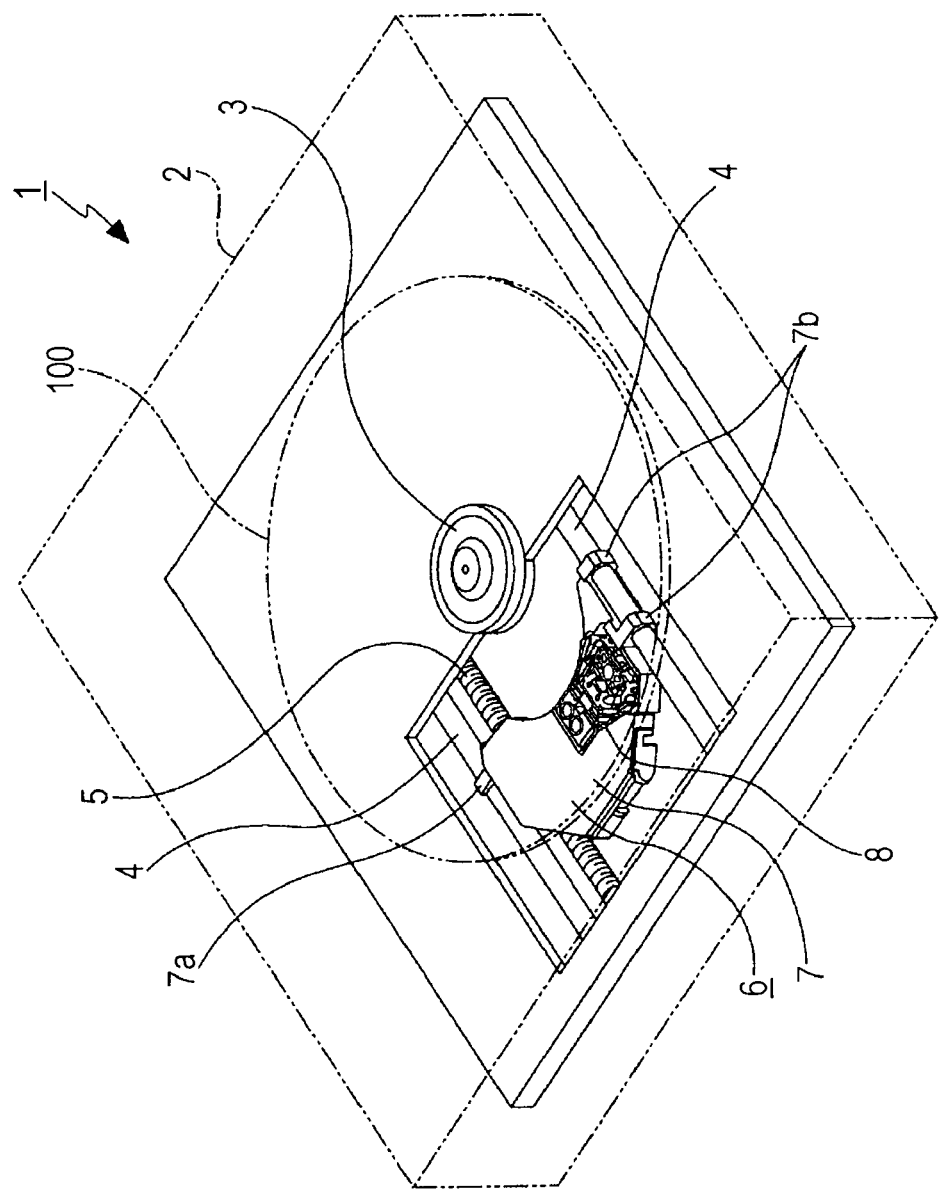
FIG. 1, along with FIGS. 2 to 7, shows an optical pickup and a disc drive apparatus according to a preferred embodiment of the present invention.

A disc drive apparatus 1 includes an external housing 2 in which various members and mechanisms are arranged (see FIG. 1). The external housing 2 has a disc slot (not shown) formed therein.

A chassis (not shown) is placed in the external housing 2. A disc table 3 is fixed to a motor shaft of a spindle motor that is attached to the chassis.

Guide shafts 4 that are parallel to each other are attached to the chassis, and a lead screw 5 rotated by a feed motor (not shown) is supported by the chassis.

An optical pickup 6 includes a moving base 7, optical components provided on the moving base 7, and an objective-lens driving device 8 disposed on the moving base 7. The moving base 7 has bearing portions 7a and 7b at both ends thereof, and the bearing portions 7a and 7b are slidably supported by the respective guide shafts 4.

A nut member (not shown) provided on the moving base 7 is engaged with the lead screw 5. When the lead screw 5 is rotated by the feed motor, the nut member is moved in a direction corresponding to the rotating direction of the lead screw 5. Accordingly, the optical pickup 6 is moved in a radial direction of a disc-shaped recording medium 100 placed on the disc table 3.

Figure 2:
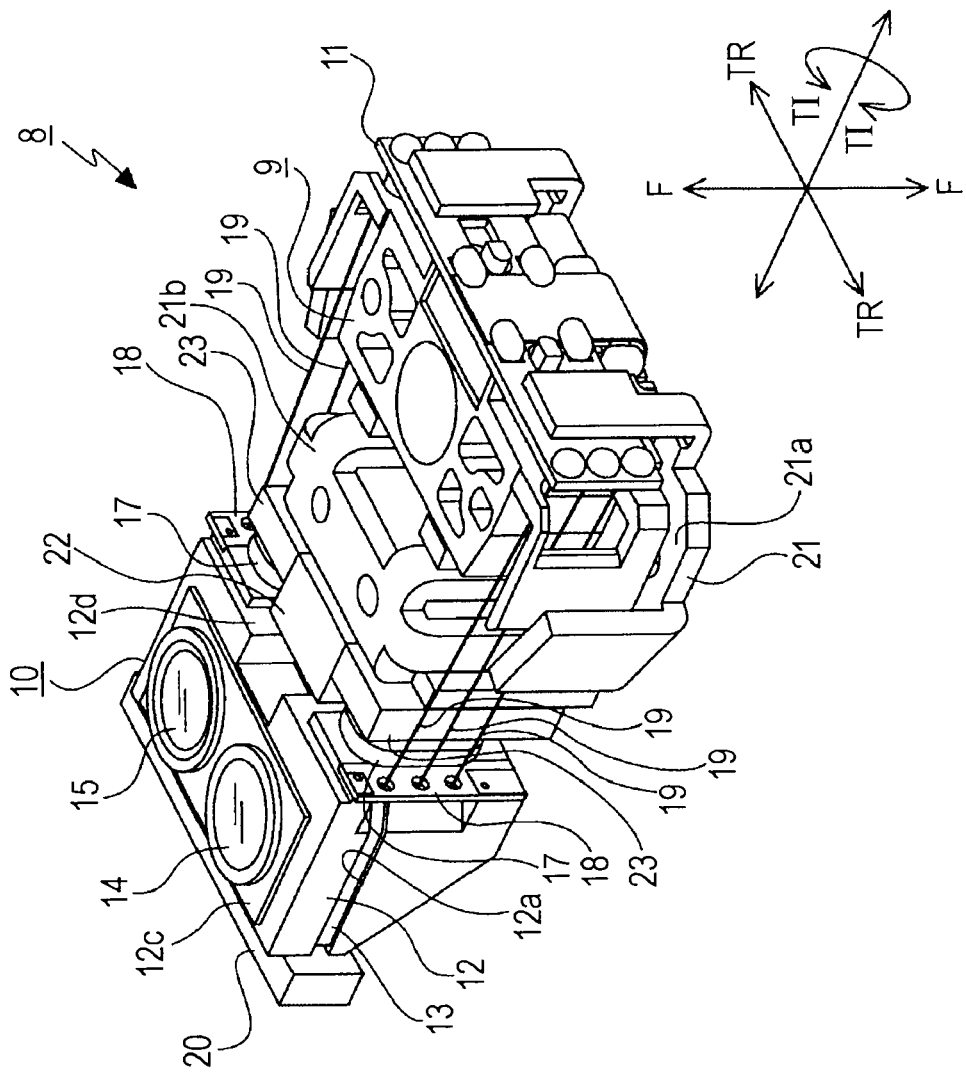
FIG. 2 is an enlarged perspective view of an objective-lens driving device.
Figure 3:
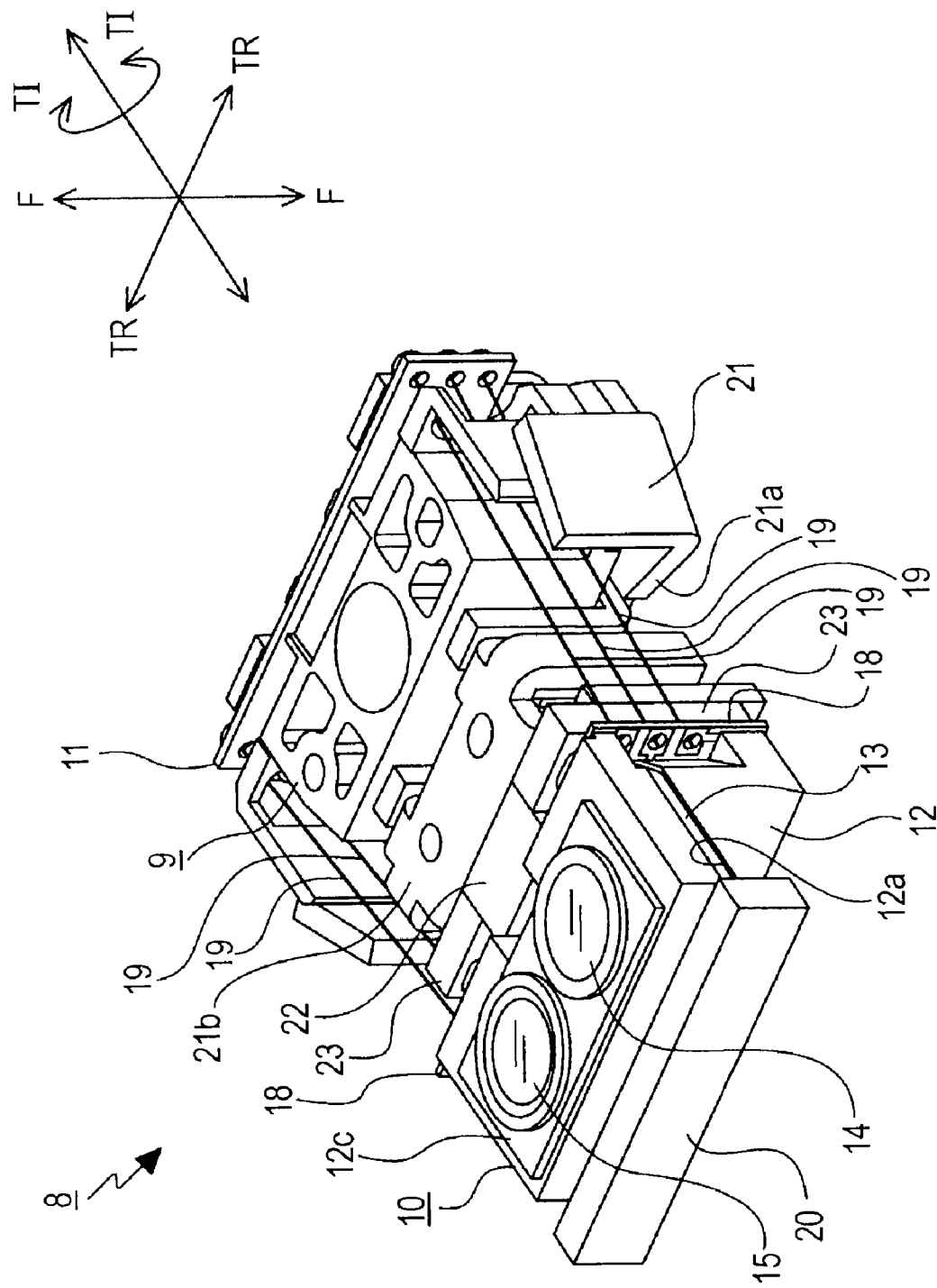
FIG. 3 is another enlarged perspective view of the objective-lens driving device, viewed from a direction different from that in FIG. 2.

The objective-lens driving device 8 includes a fixed block 9 and a movable block 10 that is movable with respect to the fixed block 9 (see FIGS. 2 and 3). The fixed block 9 and the movable block 10 are disposed on the moving base 7 (see FIG. 1).

The fixed block 9 is fixed to the moving base 7. A circuit substrate 11 is attached to a rear surface of the fixed block 9.

Figure 4:
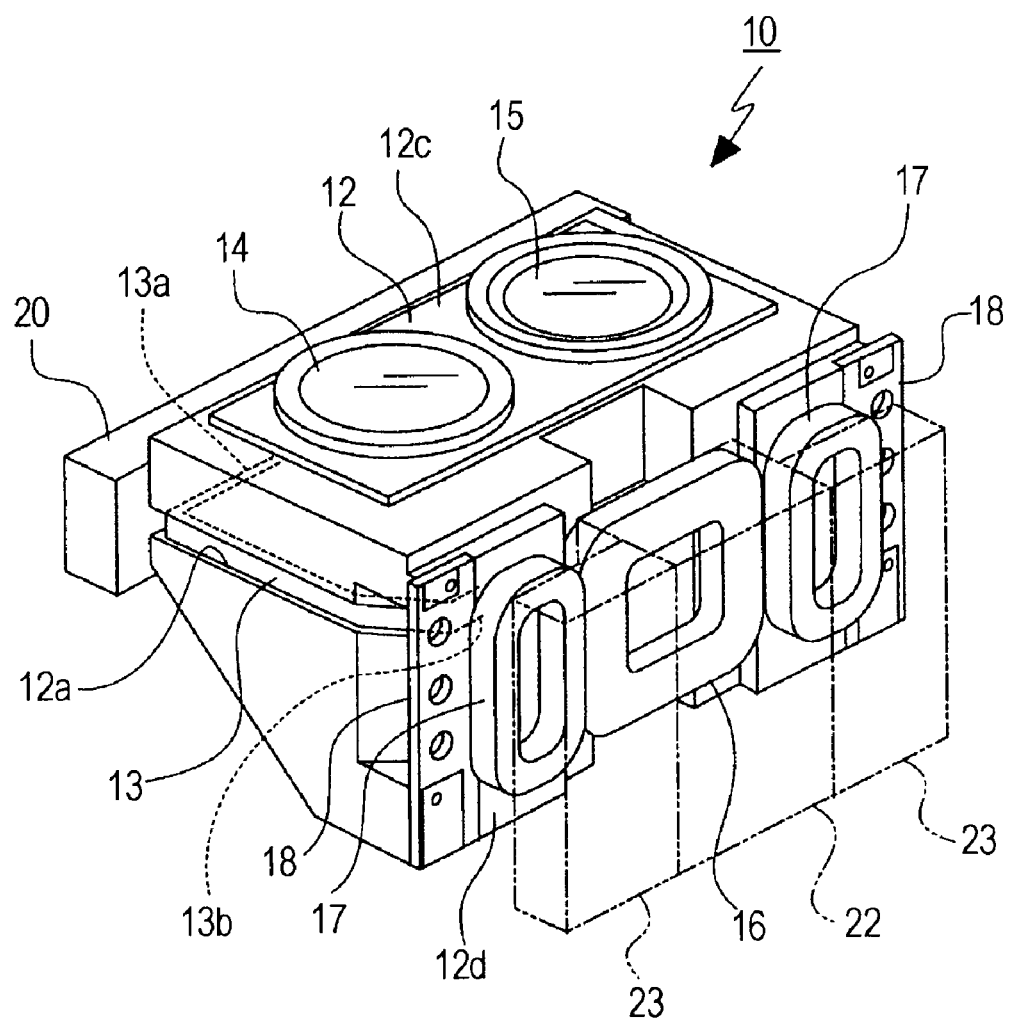
FIG. 4 is an enlarged perspective view of a movable block.
Figure 5:
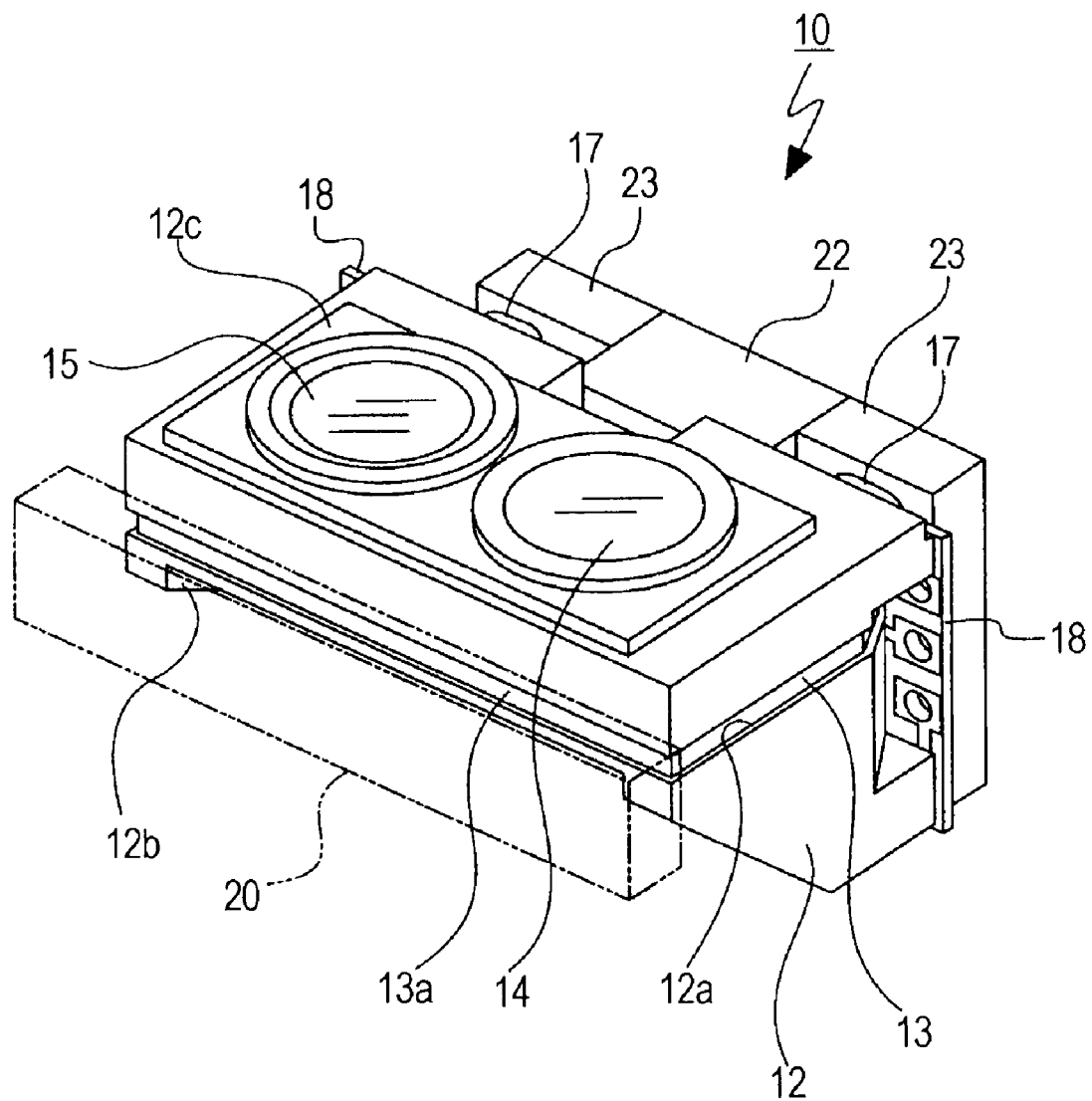
FIG. 5 is another enlarged perspective view of the movable block, viewed from a direction different from that in FIG. 4.

The movable block 10 has a lens holder 12 and components attached to the lens holder 12 (see FIGS. 4 and 5).

A coil groove 12a is formed in the lens holder 12 so as to extend over the entire circumference at a position near the upper end thereof. A first focusing coil 13 having a substantially rectangular cylindrical shape is attached to the coil groove 12a. The first focusing coil 13 is positioned such that an axial direction thereof extends in a focusing direction (vertical direction).

Front and rear portions of the first focusing coil 13 serve as a first thrust-generating portion 13a and a second thrust-generating portion 13b, respectively, which extend in the left-right direction.

An optical-path opening 12b is formed so as to open in the front side of the lens holder 12.

The lens holder 12 has a lens attachment portion 12c on the top surface thereof. Objective lenses 14 and 15 are attached to the lens attachment portion 12c. The objective lenses 14 and 15 are spaced from each other in the left-right direction (radial direction) and correspond to different kinds of disc-shaped recording media, such as a compact disc (CD) which uses a laser beam with a wavelength of around 780 nm, a digital versatile disc (DVD) which uses a laser beam with a wavelength of around 660 nm, and a Blu-ray disc which uses a laser beam with a wavelength of around 405 nm.

A rising mirror is disposed below each of the objective lenses 14 and 15. Each rising mirror receives a laser beam from a light source (not shown) through the optical-path opening 12b and reflects the laser beam at a right angle so that the laser beam is incident on the corresponding one of the objective lenses 14 and 15.

The lens holder 12 has a coil attachment portion 12d on a rear surface thereof. A second focusing coil 16 and tracking coils 17 are attached to the coil attachment portion 12d. Each of the second focusing coil 16 and the tracking coils 17 has a substantially rectangular cylindrical shape and is attached to the coil attachment portion 12d such that an axial direction thereof extends in a tangential direction. The tracking coils 17 are disposed on the left and right sides of the second focusing coil 16. A pair of tilting coils (not shown) are attached to the lens holder 12.

Connecting substrates 18 are attached to the coil attachment portion 12d of the lens holder 12 at the left and right edges thereof. Terminals of the first focusing coil 13, the second focusing coil 16, the tracking coils 17, and the tilting coils are attached to terminals of the connecting substrates 18. As shown in FIGS. 2 and 3, front ends of support springs 19 are joined to the connecting substrates 18 by, for example, soldering. The support springs 19 are made of a conductive metal material and have, for example, a wire-like shape.

Rear ends of the support springs 19 are joined by, for example, soldering to the circuit substrate 11 attached to the fixed block 9.

As described above, the support springs 19 are joined to the connecting substrates 18 on the movable block 10 and the circuit substrate 11 on the fixed block 9 at the ends thereof. Thus, the movable block 10 is suspended in midair by being connected to the fixed block 9 by the support springs 19.

In the objective-lens driving device 8, a drive current is supplied from a power supply circuit (not shown) to the first focusing coil 13, the second focusing coil 16, the tracking coils 17, and the tilting coils through the circuit substrate 11, the support springs 19, and the connecting substrates 18.

A first focusing magnet 20 is disposed in front of the movable block 10 so as to extend in the left-right direction (see FIGS. 2 to 5). The first focusing magnet 20 is attached to, for example, an attachment portion (not shown) of the moving base 7 and is disposed above the optical-path opening 12b and in front of the first thrust-generating portion 13a of the first focusing coil 13.

A yoke member 21 made of a magnetic metal material is disposed on the moving base 7 (see FIGS. 2 and 3).

The yoke member 21 includes a base portion 21a that is disposed so as to be perpendicular to the vertical direction and a yoke portion 21b that projects upward from the base portion 21a.

A second focusing magnet 22 and tracking magnets 23 are attached to a front surface of the yoke portion 21b. Tilting magnets (not shown) are attached to the yoke member 21.

The base portion 21a and the yoke portion 21b of the yoke member 21 may also be formed separately from each other. In such a case, the base portion 21a may be formed to have a function of fixing the fixed block 9 to the moving base 7 and retaining the yoke portion 21b, and the yoke portion 21b may be formed to have a function as a dedicated yoke.

The second focusing magnet 22 is positioned so as to face the second thrust-generating portion 13b of the first focusing coil 13. The tracking magnets 23 are positioned so as to face the respective tracking coils 17. The tilting magnets are disposed so as to face the respective tilting coils.

It is not necessary that the objective-lens driving device 8 have the dedicated tilting magnets. For example, the focusing magnet 22 may be configured so as to function also as a tilting magnet. In such a case, the tilting coil is positioned so as to face the focusing magnet 22 that serves the function as a tilting magnet.

The first focusing coil 13, the second focusing coil 16, the first focusing magnet 20, the second focusing magnet 22, and the yoke member 21 form a focusing magnetic circuit. The tracking coils 17, the tracking magnets 23, and the yoke member 21 form a tracking magnetic circuit. The tilting coils, the tilting magnets, and the yoke member 21 form a tilting magnetic circuit.

When a drive current is supplied from the power supply circuit (not shown) to the first and second focusing coils 13 and 16, the tracking coils 17, or the tilting coils, a force (thrust) is generated in accordance with the direction of the drive current and the direction of magnetic flux generated in the first and second focusing magnets 20 and 22, the tracking magnets 23, or the tilting magnet. As a result, the movable block 10 is moved in the focusing direction, the tracking direction, or the tilting direction.

The focusing direction is a direction in which the movable block 10 moves toward and away from the disc-shaped recording medium 100 (the F direction in FIGS. 2 and 3), that is, the vertical direction. The tracking direction is a radial direction of the disc-shaped recording medium 100 (the TR direction in FIGS. 2 and 3), that is, the left-right direction. The tilting direction is a direction around an axis that extends in a direction (tangential direction) perpendicular to both the focusing direction and the tracking direction (the TI direction in FIGS. 2 and 3).

When the movable block 10 is moved in the focusing direction, the tracking direction, or the tilting direction, the support springs 19 are elastically deformed.

Figure 6:
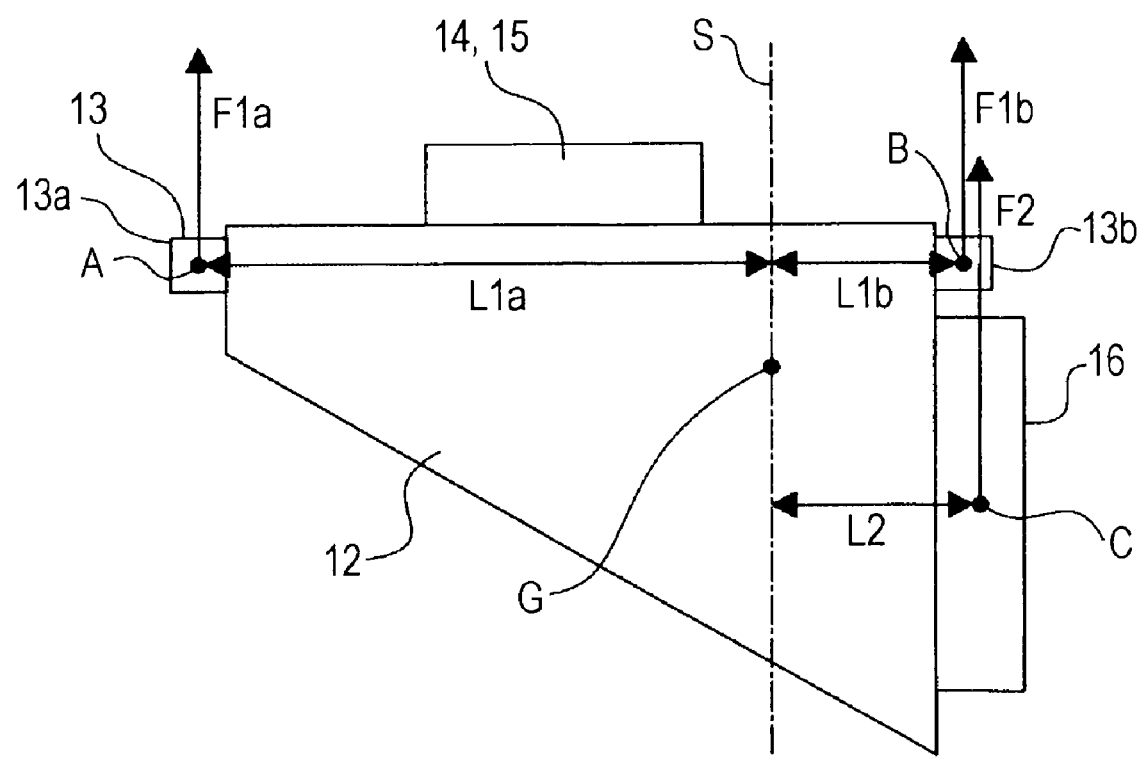
FIG. 6 is a conceptual diagram illustrating the relationship between the center of gravity of the movable block and a thrust generation point.

In the above-described focusing operation, when a drive current is supplied from the power supply circuit to the first focusing coil 13 and the second focusing coil 16, a thrust is generated in each of the first and second thrust-generating portions 13a and 13b of the first focusing coil 13 and the second focusing coil 16 so that the movable block 10 is moved in the focusing direction (see FIG. 6). The point at which a thrust is generated in the first thrust-generating portion 13a is defined as point A, the point at which a thrust is generated in the second thrust-generating portion 13b is defined as point B, and the point at which a thrust is generated in the second focusing coil 16 is defined as point C. Assuming that upward thrusts are generated, thrust F1a is generated at point A, thrust F1b is generated at point B, and thrust F2 is generated at point C. Therefore, the movable block 10 is moved in the focusing direction by the resultant force of the thrusts F1a, F1b, and F2.

In the objective-lens driving device 8, the following equation is satisfied:

$$F1a \times L1a = F1b \times L1b + F2 \times L2 \tag{1}$$

where G is the center of gravity of the movable block 10, S is a plane which includes the center of gravity G and which is perpendicular to the tangential direction, L1a is a minimum distance between the plane S and point A, L1b is a minimum distance between the plane S and point B, and L2 is a minimum distance between the plane S and point C.

The left side of Equation (1) shows a counterclockwise moment in FIG. 6, and the right side of Equation (1) shows a clockwise moment in FIG. 6. Equation (1) means that the counterclockwise moment and the clockwise moment are equal to each other. Therefore, in the objective-lens driving device 8, inclination around the center of gravity G with respect to the tangential direction, that is, inclination in which front portions of the objective lenses 14 and 15 are shifted upward or downward, does not occur during the focusing operation. Therefore, satisfactory servo characteristics can be obtained in the focusing operation.

In the disc drive apparatus 1 having the above-described structure, when the disc table 3 is rotated by the rotation of the spindle motor, the disc-shaped recording medium 100 placed on the disc table 3 is also rotated. At the same time, the optical pickup 6 is moved in the radial direction of the disc-shaped recording medium 100. Thus, a recording operation or a reproducing operation for the disc-shaped recording medium 100 is performed.

When a drive current is supplied to the first focusing coil 13 and the second focusing coil 16 during the recording operation or the reproducing operation, the movable block 10 in the objective-lens driving device 8 is moved with respect to the fixed block 9 in the focusing direction F-F shown in FIGS. 2 and 3. Thus, the focus adjustment is performed such that the laser beam that passes through the objective lens 14 or 15 is focused to form a spot on the recording surface of the disc-shaped recording medium 100.

When a drive current is supplied to the tracking coils 17, the movable block 10 in the objective-lens driving device 8 is moved with respect to the fixed block 9 in the tracking direction TR-TR shown in FIGS. 2 and 3. Thus, the tracking adjustment is performed such that the laser beam that passes through the objective lens 14 or 15 is focused to form a spot on the disc-shaped recording medium 100 at a recording track thereof.

In addition, when a drive current is supplied to the tilting coils, the movable block 10 in the objective-lens driving device 8 is moved with respect to the fixed block 9 in the tilting direction TI-TI shown in FIGS. 2 and 3. Thus, the tilt adjustment is performed such that the optical axis of the laser beam that passes through the objective lens 14 or 15 becomes perpendicular to the recording surface of the disc-shaped recording medium 100.

Figure 7:
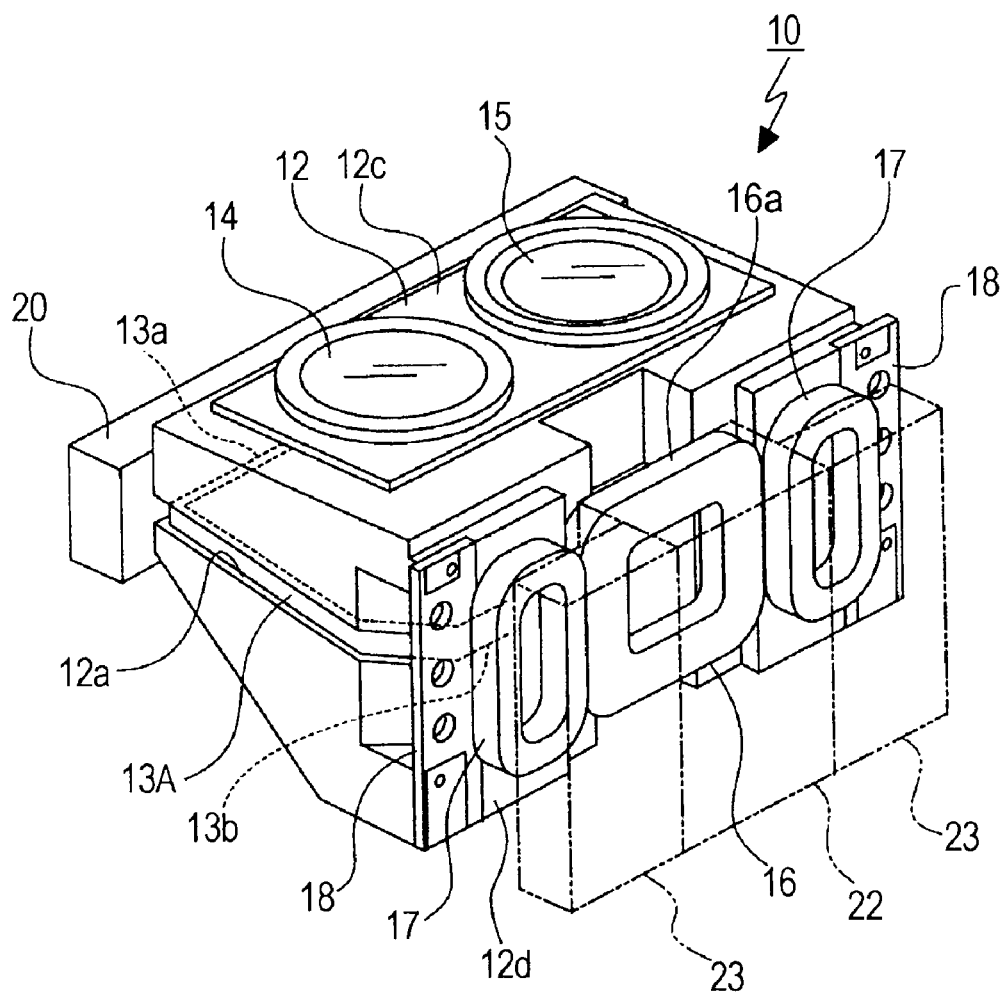
FIG. 7 is an enlarged perspective view illustrating another example of a movable block.

In the above-described structure, the first focusing coil 13 is placed horizontally. However, as shown in FIG. 7, for example, the first focusing coil 13A may also be disposed in an inclined manner. The first focusing coil 13A is attached to the lens holder 12 in an inclined manner such that the first thrust-generating portion 13a is positioned above the second thrust-generating portion 13b. The second thrust-generating portion 13b, which is positioned below the first thrust-generating portion 13a, is at the same height as an upper portion 16a of the second focusing coil 16.

As described above, the second thrust-generating portion 13b of the first focusing coil 13A is positioned at the same height as the upper portion 16a of the second focusing coil 16. The upper portion 16a serves to generate thrust in the focusing direction and is placed at a position where the magnetic power of the second focusing magnet 22 is strong. Therefore, the second thrust-generating portion 13b is also placed at a position where the magnetic power of the second focusing magnet 22 is strong, and a large thrust can be obtained in the focusing operation.

As described above, the optical pickup 6 includes the first focusing coil 13 and the second focusing coil 16. The first focusing coil 13 is attached to the lens holder 12 in such a manner that the first thrust-generating portion 13a and the second thrust-generating portion 13b are arranged in the front-rear direction. The second focusing coil 16 is attached to the lens holder 12 such that the axial direction thereof extends in the tangential direction. Therefore, the optical-path opening 12b can be formed with a large opening area in the lens holder 12. In addition, the thickness of the movable block 10 can be reduced because no focusing coil is attached to the front surface of the lens holder 12. As a result, the thickness of the optical pickup 6 can be reduced and a sufficiently large thrust can be generated in the focusing operation.

In addition, since no focusing coil is attached to the front surface of the lens holder 12, the size of the movable block 10 in the tangential direction can be reduced and high-order resonance characteristics can be improved.

In addition, since the thickness of the movable block 10 can be reduced, the weight of the movable block 10 can be reduced accordingly. Thus, the sensitivity in the focusing operation, tracking operation, and tilting operation can be improved.

In the objective-lens driving device 8, the first focusing coil 13 is positioned so as to surround the two objective lenses 14 and 15. Therefore, the stability of the focusing operation is improved and sufficiently large thrust can be generated in the focusing operation.

Although two objective lenses 14 and 15 are provided in the above-described example, the number of objective lenses is not limited to two and may also be one, three, or more.

In the above-described example, the tilt adjustment is performed when a drive current is supplied to the tilting coils. However, it is not necessary that the objective-lens driving device 8 have a dedicated tilting magnetic circuit, and one of the focusing magnetic circuit and the tracking magnetic circuit may serve a function as the tilting magnetic circuit. For example, in the case where the focusing magnetic circuit functions as the tilting magnetic circuit, the tilt adjustment can be performed such that the movable block 10 is moved with respect to the fixed block 9 in the tilting direction TI-TI by supplying a drive current to the first focusing coil 13 and the second focusing coil 16 in the opposite directions.

Although the focusing direction, the tracking direction, and the tangential direction are referred to as the vertical direction, the left-right direction, and the front-rear direction, respectively, for simplicity, the directions are not limited to those described above.

The shapes and structures of each element described above in the preferred embodiment of the present invention are merely examples of the present invention, and do not limit the technical scope of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. An optical pickup, comprising:
    a moving base configured to move in a radial direction of a disc-shaped recording medium mounted on a disc table; and
    an objective-lens driving device disposed on the moving base, wherein
    the optical pickup irradiates the disc-shaped recording medium on the disc table with a laser beam through an objective lens, the laser beam being emitted from a light source and reflected by a rising mirror,
    the objective-lens driving device includes
       a fixed block fixed to the moving base,
       a movable block having the objective lens and a lens holder configured to hold the objective lens, the lens holder having an optical-path opening through which the laser beam emitted from the light source to be incident on the rising mirror passes, the movable block being movable with respect to the fixed block in at least a focusing direction in which the movable block moves toward and away from a recording surface of the disc-shaped recording medium and a tracking direction which is substantially a radial direction of the disc-shaped recording medium,
       a plurality of support springs configured to connect the fixed block and the movable block to each other,
       a focusing magnetic circuit configured to move the movable block in the focusing direction and including a first focusing coil, a second focusing coil, a first focusing magnet, and a second focusing magnet, and
       a tracking magnetic circuit configured to move the movable block in the tracking direction and including a tracking coil and a tracking magnet,
    an optical path of the laser beam that passes through the optical-path opening in the movable block extends in a tangential direction which is perpendicular to both the focusing direction and the tracking direction,
    the first focusing coil includes a first thrust-generating portion and a second thrust-generating portion that generate thrusts when the movable block is to be moved in the focusing direction, and is attached to the lens holder such that the first thrust-generating portion and the second thrust-generating portion are spaced from each other in the tangential direction,
    the second focusing coil is attached to a surface of the lens holder that faces the fixed block such that an axial direction of the second focusing coil coincides with the tangential direction, and the first focusing magnet and the second focusing magnet are arranged in the tangential direction with the movable block disposed therebetween.

2. The optical pickup according to claim 1, wherein
each of the first focusing coil, the second focusing coil, and the tracking coil is formed in a substantially rectangular cylindrical shape having four side portions, and
a side portion of the first focusing coil that is positioned near the second focusing coil serves as the second thrust-generating portion and is disposed at substantially the same position in the focusing direction as the position of a side portion of the second focusing coil that extends in the tracking direction.

3. The optical pickup according to claim 1, wherein the following equation is satisfied:

$$F1a \times L2a = F1b \times L1b + F2 \times L2$$

where
F1$a$ is a thrust in the focusing direction generated in the first thrust-generating portion of the first focusing coil due to a drive current supplied to the first focusing coil and magnetic flux of the first focusing magnet,
F1$b$ is a thrust in the focusing direction generated in the second thrust-generating portion of the first focusing coil due to the drive current supplied to the first focusing coil and magnetic flux of the second focusing magnet,
F2 is a thrust in the focusing direction generated in the second focusing coil due to a drive current supplied to the second focusing coil and the magnetic flux of the second focusing magnet,
G is the center of gravity of the movable block,
S is a plane including the center of gravity G and perpendicular to the tangential direction,
L1$a$ is a minimum distance between the plane S and a point at which the thrust F1$a$ is generated,
L1$b$ is a minimum distance between the plane S and a point at which the thrust F1$b$ is generated, and
L2 is a minimum distance between the plane S and a point at which the thrust F2 is generated.

4. The optical pickup according to claim 1, wherein
a plurality of the objective lenses are provided, the objective lenses being arranged in the tracking direction, and
the first focusing coil is arranged so as to surround the objective lenses.

5. The optical pickup according to claim 1, wherein the first and second focusing magnets are differently sized.

6. The optical pickup apparatus according to claim 5, wherein the first focusing magnet is longer than the second focusing magnet in the tracking direction.

7. The optical pickup apparatus according to claim 5, wherein the second focusing magnet is longer than the first focusing magnet in the focusing direction.

8. The optical pickup apparatus according to claim 1, wherein an axial direction of the first focusing coil coincides with the focusing direction and the first focusing coil is inclined with respect to a plane formed in the tangential and tracking directions.

9. The optical pickup apparatus according to claim 1, wherein the movable block includes a groove that accommodates the first focusing coil.

10. The optical pickup apparatus according to claim 9, wherein the first focusing coil is attached to the groove in the movable block.

11. A disc drive apparatus, comprising:
a disc table configured to receive a disc-shaped recording medium; and
an optical pickup configured to irradiate the disc-shaped recording medium on the disc table with a laser beam through an objective lens, the laser beam being emitted from a light source and reflected by a rising mirror, the optical pickup including a moving base configured to move in a radial direction of the disc-shaped recording medium on the disc table and an objective-lens driving device disposed on the moving base, wherein
the objective-lens driving device includes
a fixed block fixed to the moving base,
a movable block having the objective lens and a lens holder configured to hold the objective lens, the lens holder having an optical-path opening through which the laser beam emitted from the light source to be incident on the rising mirror passes, the movable block being movable with respect to the fixed block in at least a focusing direction in which the movable block moves toward and away from a recording surface of the disc-shaped recording medium and a tracking direction which is substantially a radial direction of the disc-shaped recording medium,
a plurality of support springs configured to connect the fixed block and the movable block to each other,
a focusing magnetic circuit configured to move the movable block in the focusing direction and including a first focusing coil, a second focusing coil, a first focusing magnet, and a second focusing magnet, and
a tracking magnetic circuit configured to move the movable block in the tracking direction and including a tracking coil and a tracking magnet,
an optical path of the laser beam that passes through the optical-path opening in the movable block extends in a tangential direction which is perpendicular to both the focusing direction and the tracking direction,
the first focusing coil includes a first thrust-generating portion and a second thrust-generating portion that generate thrusts when the movable block is to be moved in the focusing direction, and is attached to the lens holder such that the first thrust-generating portion and the second thrust-generating portion are spaced from each other in the tangential direction,
the second focusing coil is attached to a surface of the lens holder that faces the fixed block such that an axial direction of the second focusing coil coincides with the tangential direction, and
the first focusing magnet and the second focusing magnet are arranged in the tangential direction with the movable block disposed therebetween.

* * * * *